W. L. BRALEY.
SEEDING MACHINE.
APPLICATION FILED AUG. 9, 1915.
1,215,472.
Patented Feb. 13, 1917.
2 SHEETS—SHEET 1.
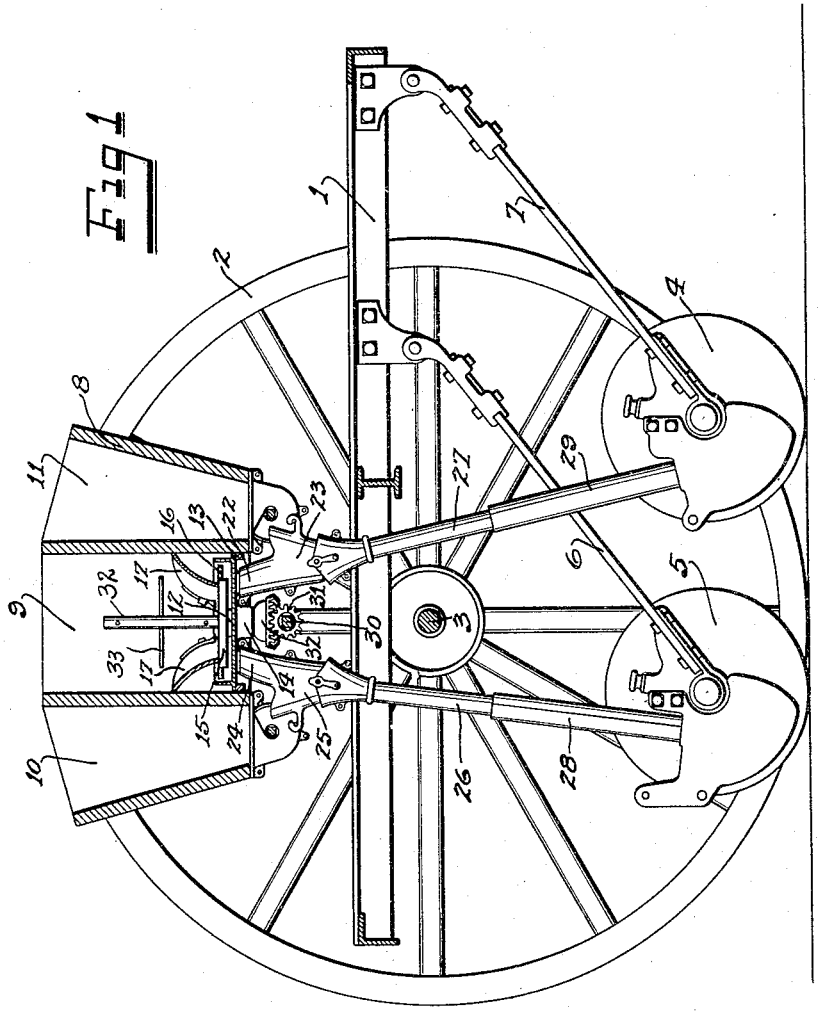
Witnesses
Edwin L. Beale
Chas. D. Welch
Inventor
William L. Braley
By Staley & Bowman
Attorneys

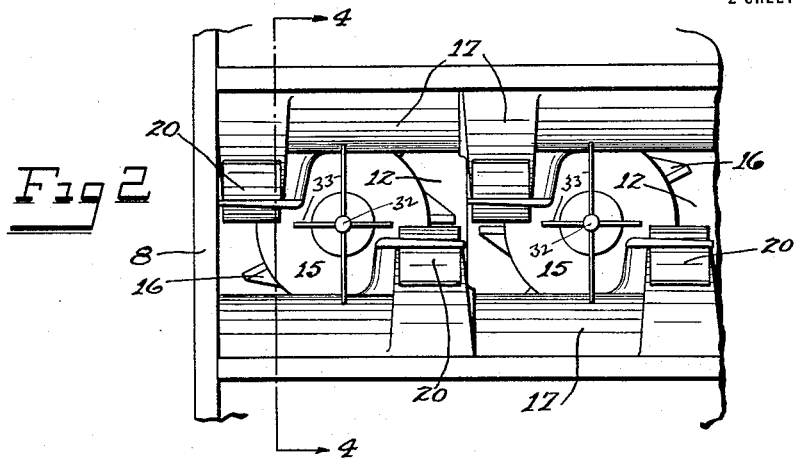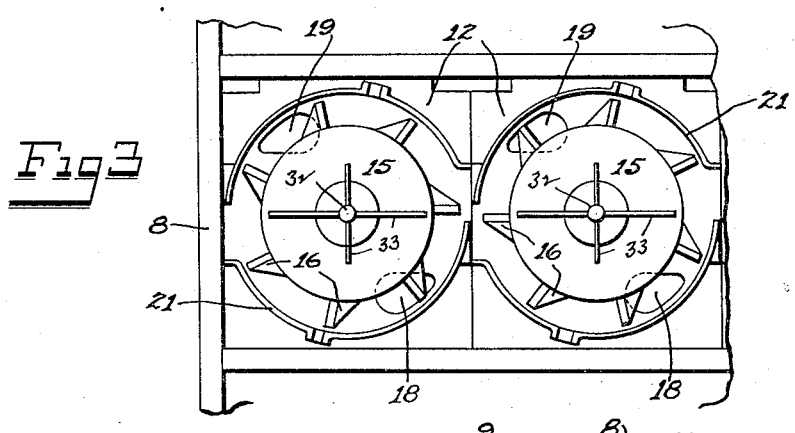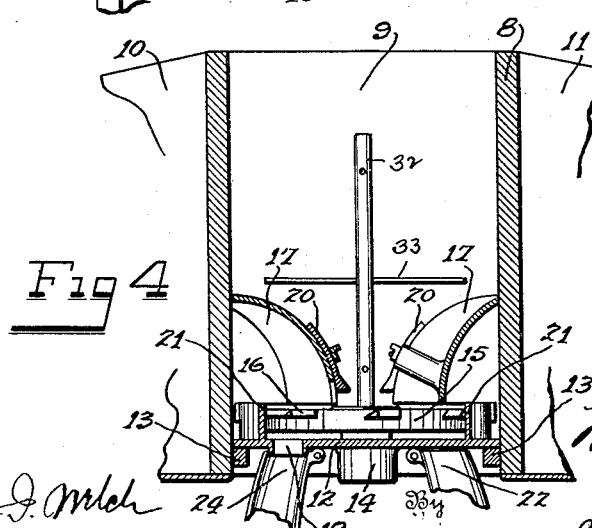

UNITED STATES PATENT OFFICE.

WILLIAM L. BRALEY, OF SPRINGFIELD, OHIO, ASSIGNOR TO THE AMERICAN SEEDING MACHINE COMPANY, OF SPRINGFIELD, OHIO, A CORPORATION OF OHIO.

SEEDING-MACHINE.

1,215,472.  Specification of Letters Patent.  Patented Feb. 13, 1917.

Application filed August 9, 1915. Serial No. 44,479.

*To all whom it may concern:*

Be it known that I, WILLIAM L. BRALEY, a citizen of the United States, residing at Springfield, in the county of Clark and State of Ohio, have invented certain new and useful Improvements in Seeding-Machines, of which the following is a specification.

My invention relates to improvements in seeding machines of the narrow row type in which are employed two zig-zag ranks of furrow openers, the invention relating more particularly to a machine of this type which is designed to sow fertilizer simultaneously with the seed.

In machines of this character it has been common to employ two separate hoppers, one for each rank of furrow openers, which necessitates one of the hoppers being mounted well forward on the frame, which either places an undue weight upon the draft animals or requires a forward truck for supporting the weight of the forward part of the machine.

One of the objects of my invention is to provide an arrangement whereby a single hopper, having a plurality of compartments for the seed and fertilizer, may be employed so mounted that its weight will tend to balance the weight of the machine when in operation and thus relieve the draft animals from any excessive weight, but at the same time be such that an effective feed of the fertilizer material to both ranks of furrow openers is furnished.

A further object of my invention is to provide, in a machine of the character referred to, a novel arrangement for feeding the fertilizer to the respective ranks of furrow openers from a single fertilizer compartment in an effective manner.

In the accompanying drawings:—

Figure 1 is a longitudinal section of so much of a seeding machine as is necessary to illustrate my improvements.

Fig. 2 is a top plan view of a portion of a fertilizer hopper with the cover removed.

Fig. 3 is a top plan view of the same with the housing members removed.

Fig. 4 is a section on the line 4—4 of Fig. 2.

In the said drawings, 1 represents the frame of the machine, 2 one of the carrying wheels, and 3 the axle, all arranged and constructed in the usual manner. In the present case, but two furrow openers are shown, one furrow opener of the front rank and one of the rear rank. The furrow openers of the respective ranks are arranged staggered with respect to each other in a manner common in machines of this character. The furrow openers which I have illustrated are of the well known concavo-convex disk type, 4 representing the furrow opener of the front rank and 5 the furrow opener of the rear rank, these furrow openers being pivotally connected to the frame of the machine by drag bars 6 and 7 in the usual way.

In the sowing of fertilizer, it is quite essential that the material should be given a substantially straight or vertical drop from the distributers, otherwise there is a tendency for the material to stick in the conduits which connect the distributers with the furrow openers and clog the same. In order that such a result may be accomplished in the present machine, in which, for the reasons before stated, but a single fertilizer hopper is employed common to both ranks of furrow openers, I have devised the following arrangement of parts: The hopper 8 is divided into a central fertilizer compartment 9 and two seed compartments 10 and 11 arranged on opposite sides of the fertilizer compartment, this hopper being suitably supported from the main frame 1 with the longitudinal center thereof substantially in line with the axis of the axle 3. Heretofore, in sowing fertilizer, it has been common to discharge the fertilizer through openings which are arranged on one side of the bottom of the hopper. In such an arrangement, however, in the present form of machine, it would be necessary to incline the conduits or tubes leading to one rank of furrow openers to such an angle as to impair the efficiency of the feed due to the tendency of the fertilizer to stick in the tubes and clog the same unless it is given a sufficiently straight or vertical drop. In order to overcome this difficulty I have arranged the discharge openings for one rank of furrow openers on one side of the hopper and the discharge openings for the other rank on the opposite side of the hopper. 12 represents metallic plates supported on cleats 13 which form the hopper bottom.

Each of these plates is provided with a central bearing 14 to receive the hub of a feed wheel 15 which has projecting fingers 16 for the purpose of carrying the fertilizer into the housing 17 and discharging it through the respective openings 18 and 19, the openings 18 being arranged on one side of the hopper and the openings 19 on the other. The housings 17 are provided with cut-offs 20 in the usual way for regulating the quantity of fertilizer sown and the feed wheels are confined by the usual upwardly extending walls 21 so as to form pockets into which the fertilizer drops so that the quantity sown may be accurately measured by the cut-offs. Each feed wheel is driven from the feed shaft 30 through the medium of a bevel pinion 31 on said shaft and bevel gear 32 connected to the hub of the wheel; the feed shaft being driven in the usual way from the axle 3 which rotates with the carrying wheels. Attached to each of the feed wheels is an agitator consisting of an upwardly extending standard 32 having a plurality of laterally extending fingers 33 for the purpose of preventing the fertilizer material from bridging over in the hopper.

The fertilizer discharged through the openings 18 enters the spout 22 of the cup 23, which cup receives the seed from the hopper 11. The fertilizer from the discharge opening 19 of each distributer enters the spout 24 of the cup 25 which receive the seed from the hopper 10. The fertilizer and seed from the respective cups are conducted by the conduits or tubes 26 and 27 to the tubes 28 of the furrow openers of the respective ranks.

It will be noticed from the construction described that each feed wheel 15 will discharge the fertilizer carried thereby through two separate openings, which is the preferable construction, although my invention in its broadest aspect would also contemplate the use of a single feed wheel for each opening, the openings, however, being arranged on opposite sides of the hopper in the manner described. In such a modified arrangement the feed wheels of course would be constructed of smaller diameter than the feed wheels shown in the drawings in order to accommodate the increased number of feed wheels required.

Having thus described my invention, I claim:—

1. In a seeding machine, furrow openers one arranged in advance of the other, a transversely arranged hopper having a central fertilizer compartment, said compartment having openings in the bottom thereof, said openings being arranged in two parallel series, one series on one side of said hopper and the other series on the opposite side of said hopper, the forward series of openings having a communication with the forward furrow openers and the rear series of openings a communication with the rear furrow openers, and means in said compartment for discharging the fertilizer through said opening.

2. In a seeding machine, furrow openers, one arranged forward of the other, a hopper having a central transversely extending fertilizer compartment and seed compartments on each side of said fertilizer compartment and parallel therewith, said fertilizer compartment having discharge openings arranged on opposite sides thereof, the forward openings communicating with the forward furrow openers and the rear openings with the rear furrow openers, conduits extending from said hopper to said furrow openers and communicating with the respective openings in said fertilizer compartment and also with the seed compartments, and means in said fertilizer compartment for discharging fertilizer through said openings.

3. In a seeding machine, furrow openers one arranged forward of the other, a hopper having a central transversely extending fertilizer compartment, said compartment having a series of discharge openings arranged on opposite sides thereof, the forward openings having a communication with the forward furrow openers and the rear opening a communication with the rear furrow openers, and distributing wheels each common to one front and one rear opening for discharging the fertilizer therethrough.

4. In a seeding machine, furrow openers, one arranged in advance of the other, a hopper having a central transversely extending fertilizer compartment, a seed compartment on each side of said fertilizer compartment and arranged parallel therewith, said fertilizer compartment having discharge openings arranged on opposite sides thereof, the forward opening communicating with the forward furrow openers and the rear openings with the rear furrow openers, conduits extending from said hopper to said furrow openers and communicating with the respective openings in said fertilizer compartment and also with the seed compartments, and distributing wheels each common to one front and one rear opening for discharging the fertilizer therethrough.

5. In a seeding machine, a main frame, a transversely extending hopper supported on said frame, said hopper being divided into a transversely extending central fertilizer compartment and transversely extending seed compartments arranged on opposite sides of said fertilizer compartment, and furrow openers one arranged in advance of the other, the forward seed compartment and the fertilizer compartment having a feeding communication with the forward furrow opener and the rear seed compartment and said fertilizer compartment having a feeding communication with the rear furrow opener.

6. In a seeding machine, a main axle, a transversely extending hopper arranged substantially central over said axle, said hopper having a central fertilizer compartment and seed compartments arranged on opposite sides of said fertilizer compartment, furrow openers one arranged in advance of the other, said fertilizer compartment having openings on opposite sides thereof, the forward one of which communicates with the forward furrow opener and the rear one of which communicates with the rear furrow opener, and a distributing wheel common to one front and one rear opening for discharging the fertilizer therethrough.

7. In a seeding machine, furrow openers one arranged in advance of the other, a hopper having a central fertilizer compartment, housings arranged on opposite sides of said compartment, said housings having discharge openings, the forward opening having communication with the forward furrow opener and the rear opening communicating with the rear furrow opener, and means in said compartment arranged to discharge the fertilizer through said openings.

8. In a seeding machine, furrow openers one arranged in advance of the other, a hopper having a plurality of compartments, a central compartment and an additional compartment at each side thereof, seed spouts connecting the furrow openers to said hopper, each spout being located intermediate the central compartment and a compartment at the side thereof and means at the upper end of a feed spout common to the central compartment and one of the compartments at the side thereof whereby the seed conduit will connect with two compartments for the purpose specified.

9. In a seeding machine, furrow openers one arranged in advance of the other, a hopper comprising a central compartment and a compartment at each side thereof, a seed conduit for each furrow opener located substantially in line with the vertical walls separating the central compartment from the compartments at the sides thereof, and means common to the central compartment and the ones at the side thereof for connecting each seed conduit with two compartments, substantially as specified.

10. In a seeding machine, a hopper comprising two side compartments and an intermediate compartment, the intermediate compartment having openings in the bottom thereof, one series on one side of said hopper and the other series on the opposite side of said hopper, furrow openers one in advance of the other, seed conduits connecting each furrow opener with one of said openings and located at a point intermediate between the intermediate compartment and the side compartment whereby both the side compartments and the intermediate compartment will be connected to a seed conduit, as specified.

In testimony whereof, I have hereunto set my hand this 5th day of August 1915.

WILLIAM L. BRALEY.

Witness:
  CHAS. I. WELCH.

Copies of this patent may be obtained for five cents each, by addressing the "Commissioner of Patents, Washington, D. C."